US006993521B2

(12) United States Patent
Aull

(10) Patent No.: US 6,993,521 B2
(45) Date of Patent: Jan. 31, 2006

(54) SYSTEM AND METHOD FOR ARRANGING DIGITAL CERTIFICATES ON A HARDWARE TOKEN

(75) Inventor: Kenneth W. Aull, Fairfax, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 943 days.

(21) Appl. No.: 09/823,312

(22) Filed: Mar. 30, 2001

(65) Prior Publication Data

US 2002/0143707 A1 Oct. 3, 2002

Related U.S. Application Data

(60) Provisional application No. 60/210,523, filed on Jun. 9, 2000.

(51) Int. Cl.
*G06F 17/30* (2006.01)

(52) U.S. Cl. .......................... 707/7; 707/102; 713/156; 713/182; 713/201

(58) Field of Classification Search .................... 707/7, 707/102, 3, 100, 104.1; 713/182, 201, 156
See application file for complete search history.

(56) References Cited

U.S. PATENT DOCUMENTS 6,223,291 B1 * 4/2001 Puhl .......................... 713/201
6,308,266 B1 * 10/2001 Freeman ..................... 713/156
6,314,521 B1 * 11/2001 Debry ........................ 713/201
6,463,537 B1 * 10/2002 Tello ......................... 713/182
6,505,193 B1 * 1/2003 Musgrave ..................... 707/3

* cited by examiner

*Primary Examiner*—Frantz Coby
(74) *Attorney, Agent, or Firm*—Tarolli, Sundheim, Covell & Tummino L.L.P.

(57) ABSTRACT

A system for arranging multiple certificates on a hardware token. A user may have several encryption certificates for different systems or uses. These can be stored on a single hardware token which is machine readable. Since the Windows 2000 systems require that the single sign-on certificate be placed first on the token, a method is provided for rearranging certificates so that the single sign-on certificate is always the first to be read.

10 Claims, 4 Drawing Sheets

SYSTEM AND METHOD FOR ARRANGING DIGITAL CERTIFICATES ON A HARDWARE TOKEN

CROSS-REFERENCE TO RELATED APPLICATIONS

This application claims the benefit of U.S. Provisional Application No. 60/210,523 filed on Jun. 9, 2000, the contents of which are expressly incorporated by reference herein.

BACKGROUND OF THE INVENTION

1. Field of the Invention

The present invention relates to a system and method for arranging multiple certificates on a hardware token. More particularly, the invention relates a system and method for including multiple certificates on a hardware token so that a Windows 2000 single sign-on certificate is the first certificate.

2. Background

For centuries individuals, governments, and business entities have searched for mechanisms and techniques whereby sensitive information may be transmitted to authorized parties over long distances and still remain secure. The problem faced by the foregoing entities is how can information be sent to the individual or entities that require it and still be assured that unauthorized parties may not be able to comprehend the transmitted information should they intercept it. Early methods of securing information have employed scrambling techniques, lookup tables, substitution ciphers, and code books in which letters or terms would be substituted for the original letters and terms in the information. These techniques frequently required that both the sender and receiver of information have access to the same "code book." One danger in such a technique is that the code book would fall into unauthorized hands.

In the early twentieth century, and in particular during World War II, code books were replaced by electromechanical cipher machines. Both the sender and receiver would have an identical cipher machine used to encrypt and decrypt messages sent. In order to make it more difficult to decrypt these messages the cipher machines have the ability to change the cipher used in a message or change the cipher used for every few words within a message. In order to accomplish this the cipher machine would need to know the initial state or key utilized to encrypt the message.

In recent years the cipher machines have been replaced by digital encryption algorithms in which both the sender and receiver have an identical copy of the digital encryption algorithm and a common key used to encrypt and decrypt messages. Both the encryption algorithm and key are held secret by both the sender and receiver.

More recently another encryption technique has been developed in which two separate keys are used for encryption and decryption. A public key is transmitted freely to whoever requires it and is used to encrypt messages for a particular receiver. The receiver would have an associated private key which may be used to decrypt the message encrypted with the associated public key. For each public key there is only one private key and for each private key there is only one public key. When sending a message to several recipients it is necessary to have each recipient's public key. The message would then be separately encrypted using each recipient's public key and transmitted to that particular recipient. Therefore, if ten separate entities are to receive the same message, ten separate messages would be transmitted with each message encrypted with individual's public key. With the advent of the Internet, such a public key infrastructure has gained significant acceptance as discussed in request for comments number 2459, by Ford et al., entitled "Internet X.509 Public Key Infrastructure", herein incorporated in its entirety by reference.

In addition to the need for the encryption and decryption of messages, with the advent of electronic mail and the Internet a need has developed for a secure mechanism to indicate approval and acceptance by an individual. In the past an individual would typically show his approval or acceptance of such items as a contract or an order via a handwritten signature, a stamp, or a seal which would only be held by that individual. Anyone else that attempted to imitate such a signature, stamp, or seal would be subject to criminal penalties. With the advent of electronic mail and the Internet, a need has arisen to take advantage of the ease and speed of electronic mail to indicate, by a person or entity with proper authority, approval or acceptance of a contract or purchase. This has come to be known as a digital signature in which an individual may digitally sign a document.

This digital signature capability has been implemented using the same public key infrastructure previously discussed. However, instead of an entire document being encrypted, the document itself is passed through a one-way hashing algorithm that produces a small document, referred to as a digest. This digest is then encrypted using the individual's private key, also known as a private signing key, and is appended to the document. The receiver of the document can verify the authenticity of the digital signature (digest) by stripping the signature from the document and recomputing the hash function on the document to generate an as received digest. Using a public signing key, included in the document or previously received, it is possible to decrypt the digest of the document and compare it to the digest as received. If the two digests match, then the signature is authenticated. Therefore, using the aforementioned public key infrastructure it is possible to both encrypt and decrypt messages as well as digitally sign documents.

In order to set up a system to reliably determine the identity of an owner of a key pair, a digital certificate system has been utilized. That is, certificates contain information which identify the owner, the public component of the pair and the period of time for which the certificate is valid. It is also identifies technical information about the key itself, such as the algorithm used to generate it and the key length. These certificates are generated by organizations that are responsible for verifying the identity of the individuals. The identity of the certifying organization or certificate authority, is recorded in the certificate itself and signed by a private key known only to the certificate authority itself. This allows users to verify both the integrity of the certificate and the identity of the authority. By initializing a certificate, the authority is stating that it has verified that the public key that appears in the certificate belongs to the individual listed in the certificate. The process must provide mechanisms for reliably identifying the individual and for verifying the public key listed. Traditionally, the registration of new users has been the most labor intensive aspect of such a system. It is also the most critical component to insure the trustworthiness of certificates issued. The traditional manner of handling this is to physically go to a local registration authority and present identification to identify the user.

It is possible that a single individual will have more than one type of private key and digital signature. These keys can be generated by an authority in the system in the form of a digital certificate which identifies the public key and establishes the identity of the user. However, since a person may have different functions, it is possible that additional keys for each function may be necessary. Thus, if the person is part of a group which can authorize payments, it may be necessary to have a separate certificate for that particular role. In addition, different types of systems may require different types of certificates. Accordingly, a single person may have several certificates to keep track of. Remembering all these different keys may be difficult, especially if some are not used regularly.

SUMMARY OF THE INVENTION

The present invention provides a system for keeping track of a plurality of digital certificates.

The present invention also provides a method of storing a plurality of digital certificates.

The present invention also provides a system for storing multiple certificates on a hardware token.

The present invention further provides a method for storing multiple certificates on a token.

The invention further provides a system for storing and retrieving a list of certificates on a hardware token including a Windows 2000 single sign-on certificate.

The present invention further provides a method for storing and retrieving a list of certificates on a hardware token including a Windows 2000 single sign-on certificate.

The present invention further provides a system for storing and retrieving a list of X.509v3 certificates on a hardware token and for listing a Windows 2000 single-on certificate first.

The present invention further provides a method for storing and retrieving a list of X.509v3 certificates on a hardware token so that a Windows 2000 single-on certificate is always listed first.

These and other features of this system, method and computer program will become more apparent from the following description when taken in connection with the accompanying drawings which show, for purposes of illustration only, examples in accordance with the present invention.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
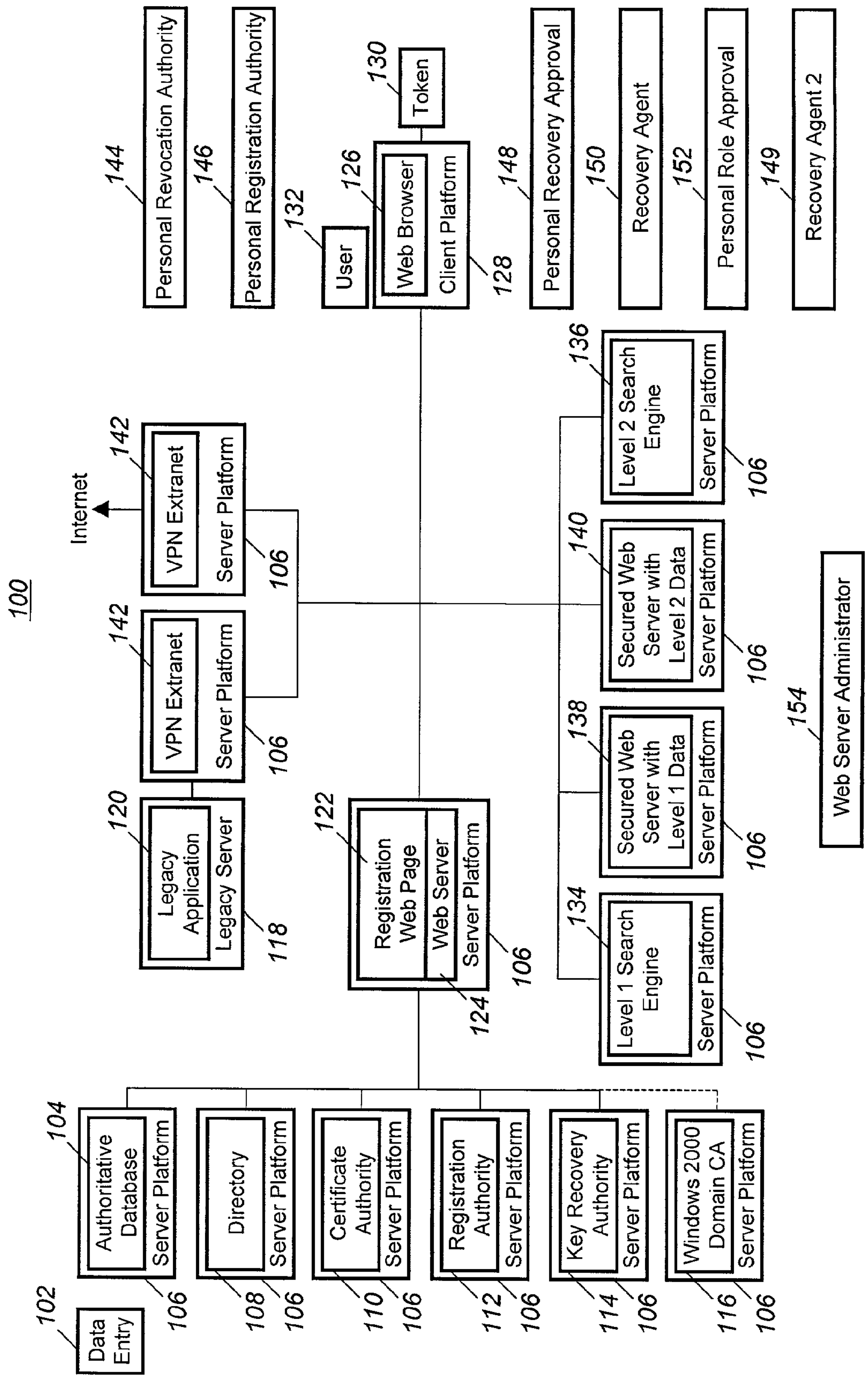
FIG. 1 is a module configuration diagram of the software, firmware, and hardware used in the embodiments of the present invention.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same.

Figure 2:
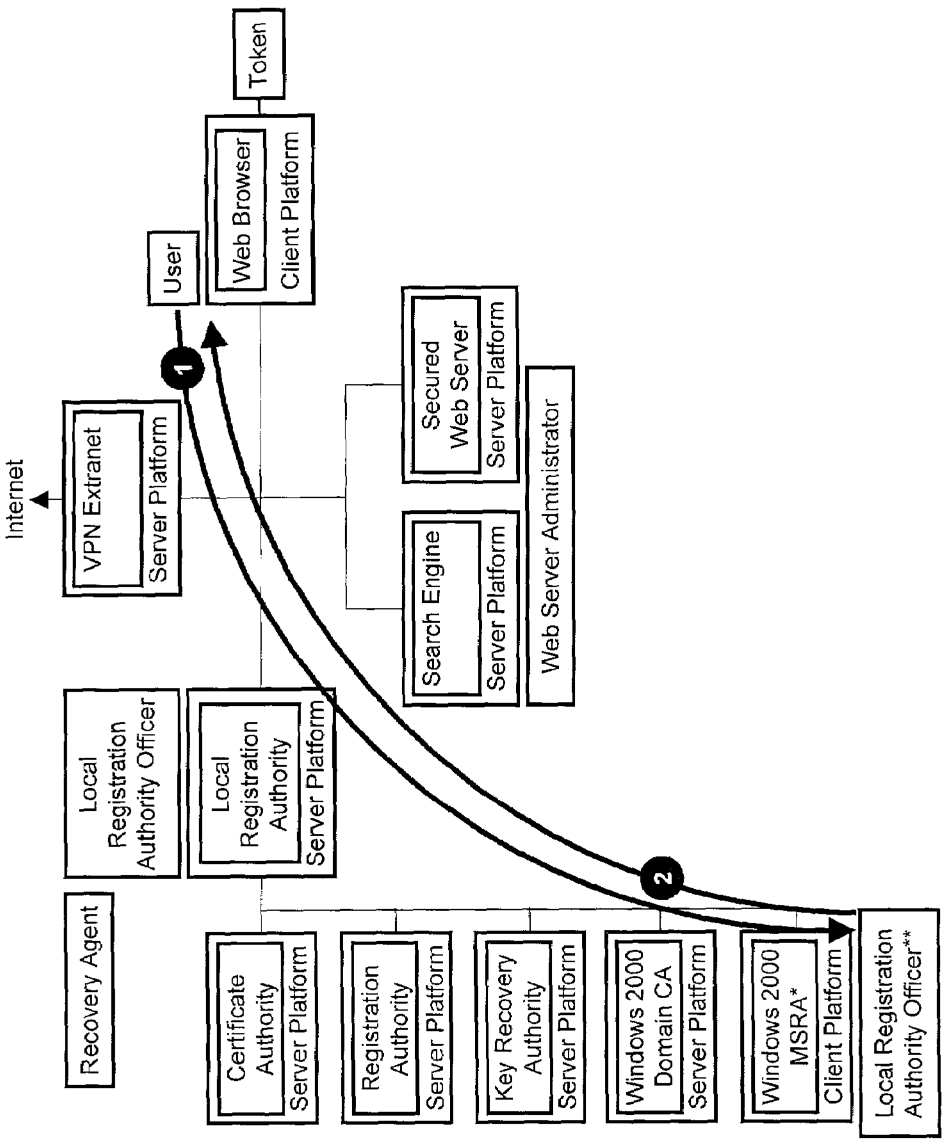
FIG. 2 is a diagram of a prior art method for single sign-on certificates.
Figure 3:
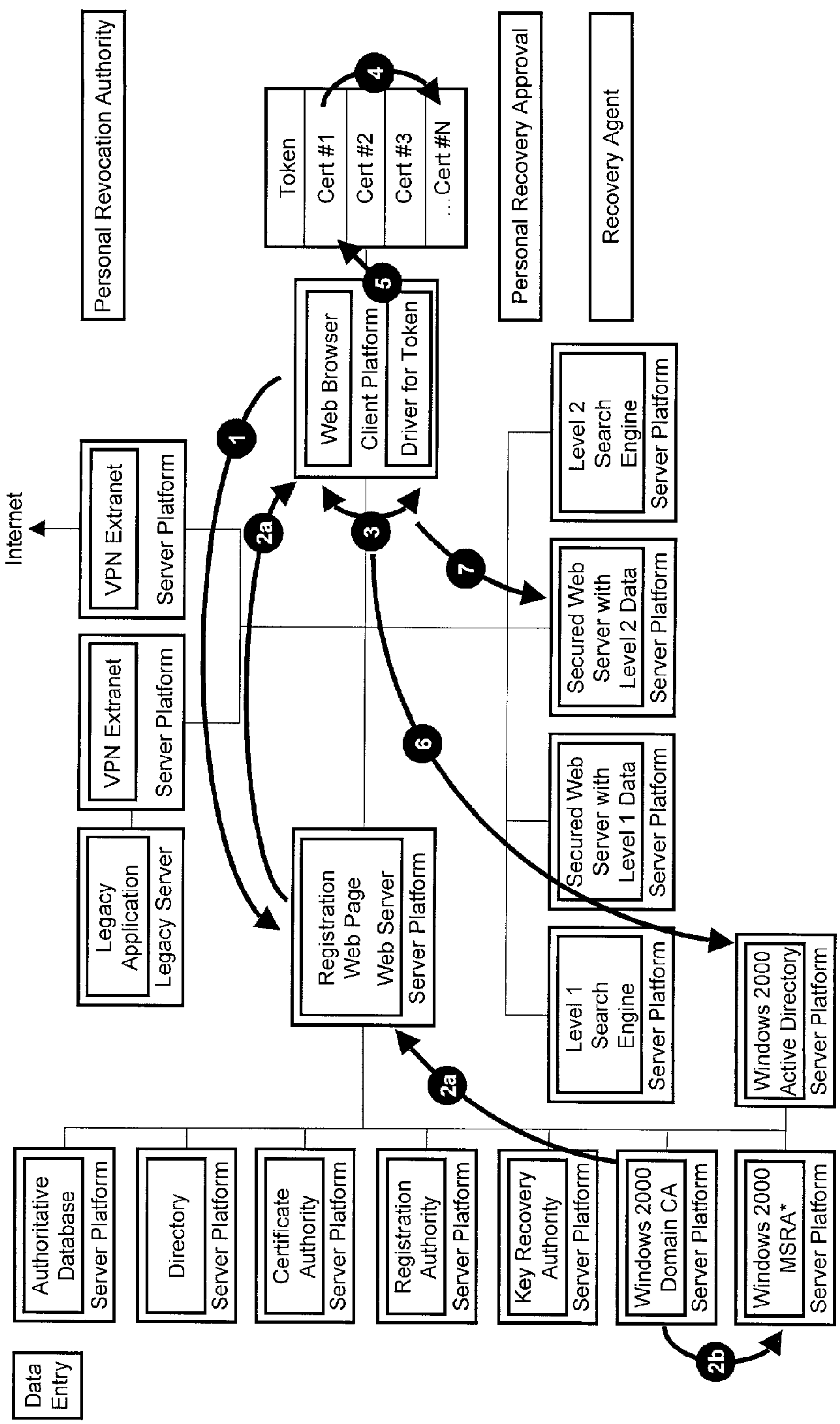
FIG. 3 is a modification of FIG. 1 with connections and dataflow being indicated.
Figure 4:
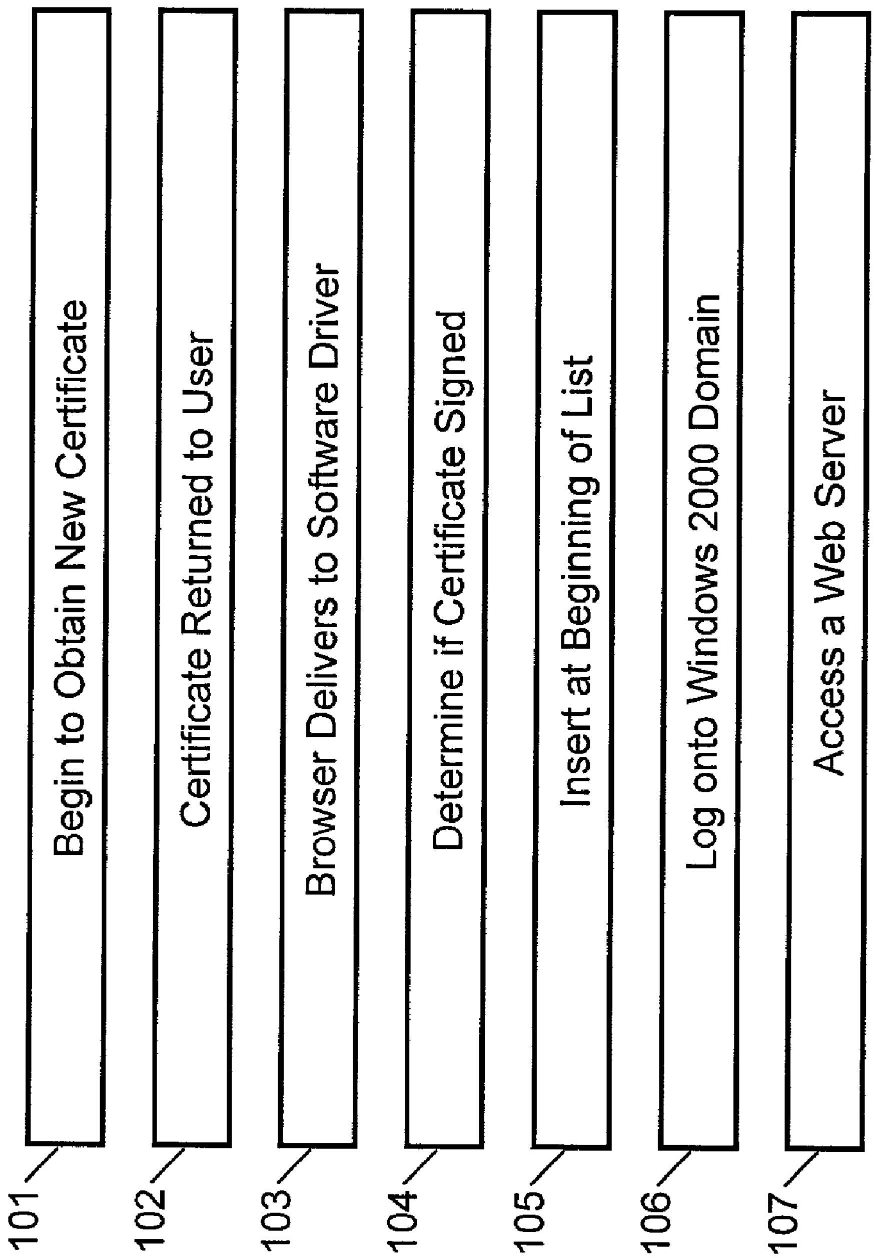
FIG. 4 is a flowchart showing the steps of the method used in regard to the system of FIG. 3.

FIG. 1 is a module configuration diagram of the software, firmware, and hardware used in the embodiments of the present invention. The blocks illustrated in FIG. 1 represent modules, code, code segments, commands, firmware, hardware, instructions and data that are executable by a processor-based system(s) and may be written in a programming language, such as, but not limited, to C++. It should be noted that the modules depicted in FIG. 1 are shown as contained in separate server platforms. However, these modules are not limited to residing on separate servers and may reside and execute one computer or any number of computers depending on the number of users the system must handle and the communications involved. FIGS. 2 through 4 further detail the operations executed by the modules shown in FIG. 1.

FIG. 1 illustrates an exemplary architecture 100 in which the Public Key Infrastructure (PKI) processes of the present invention may be practiced. However, as previously discussed, it should be understood that the present invention is not limited to the architecture 100 of FIG. 1. The Architecture 100 includes Data Entry 102 which performs a Data Entry function for Authoritative Database 104 which is resident on the server platform 106. A server platform 106 is referred to in this description but it should be understood that the present invention is not limited to any particular server architecture. The server platform 106 maybe without limitation UNIX or Windows NT servers. The authoritative database 104 contains information about members of the group or enterprise for which PKI services in accordance with the present invention are performed. The present invention is not limited by the structure of the group enterprise for which information is stored in the authoritative database 104. The authoritative database 104 information includes, without limitation, the name, address, telephone numbers, manager's name, employee identification etc., of the members of the group or enterprise. Directory 108 has the structure of the database but is optimized for fast look-up of information stored therein rather than fast data entry. The data in the Directory 108 is not changed frequently but is required to be "accessed rapidly and functions on-line as a fast phone book" containing reference information about the members of the group or enterprise stored in the authoritative database 104. Certificate authority 110 is a conventional off-the shelf software executed on server platform 106 providing storage of certificates and related information used by the present invention as described in more detail hereinafter. Registration authority 112 is also off-the shelf software executable on server platform 106 regarding registration performed by the present invention as described in more detail hereinafter. Key authority 114 is also off-the shelf server software which is executable on Server Platform 106 for recovering keys from members of the group or enterprise as described in more detail hereinafter. Windows 2000 Domain CA 116 may use certificates provided by the present invention for a single sign-on to the architecture of FIG. 1. Legacy server 118 executes legacy application programs 120. The legacy server maybe, without limitation, a main frame, mini-computer, workstation or other server hosting legacy software applications that are designed to be run on PKI processes in accordance with the present invention. The legacy applications 120 are accessible on the client side by a custom client 128 such as an emulator or custom database Graphic User Interface (GUI). Examples of emulators are terminal emulators of an IBM 3270 or terminal emulators of a vt 100. Registration web page 122, which maybe one or more pages, functions as the user interface to the architecture 100 of FIG. 1. Web Server 124 is a software application which serves Web Pages such as Web Page 122 or other HTML outputs to a web browser client which may be without limitation Apache or a Microsoft Internet Information Server. Web browser 126 is resident on client platform 128 which may be any user computer. Web browser 126 is a client software application for browsing web pages such as but not limited to HTML or XML protocols or other protocols. The Web browser 126 is programmed to operate with PKI certificates issued by the certificate authority 110. Examples of web browsers which has this capability are Netscape Navigator and the Microsoft Internet Explorer. The token 130 is a smart card, USB or other hardware token capable of generating storing and using PKI certificates. A user 132 is a person using the architecture 100. A user 132 transitions through a number of states which include a new user, current user and a former user who no longer is a member of the group or enterprise. The Architecture 100 is described with reference to two levels of security but the number of the levels of security is not a limitation of the present invention with each level corresponding to a different security requirement. The level 1 search engine 134 is a search engine which is permitted to search through the architecture 100 but is allowed access to only level 1 data which is the lowest level of security and may be without limitation data which is freely distributable Level 2 data may be considered to be proprietary. Level 2 search engine 136 is a search engine which is allowed to search through both level 1 and level 2 data. A Level N search engine (not illustrated) is a search engine which is allowed to search through servers possessing Levels 1 through N of data. A secured level server with Level 1 data is a web server containing only level 1 data which is secured so that users may have level to level 1 servers. A secured web server with level 2 data 140 is a Web Server that contains level 2 data which has been secured so that users must have level 2 access with level 2 users having access to both level 1 and level servers. A secured web server with level N data (not illustrated) is a web server that contains level N data which is accessible by user with level N or above access to all levels of data up through level N access. VPN Extranet 142 is a software application which functions as a network gateway, which as illustrated, may be either to legacy server 118 and legacy application 120 or to an external network such as the Internet. Personal registration authority 144 is a person who is in charge of revocation of members from the network 100. Personal registration authority 146 is a person who is in charge of registration of members in the network 100. Personal recovery approval 1 148 and personal recovery agent 2 149 are persons responsible for obtaining recovery of certificates. A Recovery Agent 150 is a person who performs recovery of certificates and may only recover a certificate if the certificate has first been designated as recoverable by another person. Personal role approval 152 is a person who approves different role function within the network 100. A web server administrator is in charge of various web functions in the network 100.

As described above, the token 130 is a piece of hardware on which certificates can be stored. Different types of tokens may be used as long as some type of storage device is included. The storage may be magnetic, such as on a strip or could be optical, such as a bar code or any other type storage system which is easily machine readable. The use of a token to store the certificate information is preferable to requiring the user to memorize a series of numbers. By placing the token in a reader device, it is possible to insert the identification data even faster and can be done by the operator himself. Further, it avoids the necessity to memorize identification codes. Since it is possible that a user may have a number of different certifications, it is especially useful to use a token to avoid the problem of multiple memorizations. Thus, the use of such a token in these situations creates more accuracy, avoids memory lapses and is very convenient and accurate. The token may be a device which is easily carried by the person, such as attached to a key chain or placed in a wallet so that the user can have control over it at all times without having to find a secure place to lock it.

FIG. 2 shows a prior art system which has been used in conjunction with Microsoft Windows 2000. In order to issue a digital signal for a Microsoft network, it is necessary to have the certificate issued by a Microsoft server. These systems use a single sign-on mechanism. FIG. 2 shows a variation of FIG. 1 where the system includes a Windows 2000 Microsoft registration authority officer (MSRA) and a local registration authority officer (LRAO). The user must contact the LRAO and present identification in order for the certificate to be generated on the user's behalf. The LRAO generates the certificate and stores it on the token and gives the token to the user. These are shown as steps 1 and 2 in FIG. 2.

While such a system is successfully operational as long as the user has only a single certification, it is often necessary for the user to have multiple certificates. Before Windows 2000, prior art devices utilized a dialog box asking for a PIN. If a list of certificates was possible, the user selected the particular certificate to be used in this circumstance. However, under Windows 2000 the specific subroutine will only select the first certificate on the token. Thus, if more than one certificate is stored, it is critically important that the first certificate be the Windows 2000 single sign-on certificate. While it would be possible to have only the single sign-on certificate on the hardware token, and to place any other certificates on a separate token, this is not a preferable arrangement. Thus, if more than the single sign-on certificate is stored on a hardware token, it is necessary that the single sign-on certificate always be first in the list.

FIG. 3 shows a module configuration diagram which is a variation of that shown in FIG. 1 which allows multiple certificates to be stored on a hardware token and still be suitable for a Windows 2000 domain. In this system, a Windows 2000 MSRA is also used as well as a Windows 2000 active directory. The steps of the method are also described in FIG. 4. In step 101, the user, through his web browser, begins a process of obtaining a new certificate by going to a registration web page. By going to a web page, it is possible to bypass the need for a local registration authority officer. Instead, identification is obtained directly through the web page. The certification is generated by the Windows 2000 domain CA 116 and is returned to the user in step 102A through the registration web page. Alternatively, the certificate can be returned to the MSRA if the token is installed in the MSRA rather than the client platform.

In step 103 the web browser delivers the signed certificate to the software driver for the hardware token. In step 104, the software driver parses the certificate to determine if the certificate has been signed by the Microsoft domain CA. This is possible because the Microsoft single sign-on certificate has a Microsoft proprietary extension which identifies that the certificate and key may be used for the purpose of single sign-on. As a result, it is easy to determine if the certificate falls into this category. If it is not such a certificate, it is added at the end of the list and thus becomes certification number N. However, as indicated in step 105, if the certificate has been signed by the Microsoft domain CA, the software driver moves the original certificate number 1 to the end of the list and inserts the new certificate at the beginning of the list. By utilizing this simple arrangement, it is possible to always have the Microsoft single sign-on certificate as the first one in the list.

Thus, as seen in step 106, if the user then logs on to a Windows 2000 domain, the single sign-on will be the first certificate on the token so that the client platform will obtain the correct certificate and present the correct credentials to the domain controller. As seen in step 107, when the user attempts to access a web server, the client platform will be required to present a different certificate. Since the web browser rather than the operating system obtains a certificate from the token and since the web browser is able to view all certificates on the token, not just the first one, the user is able to select any certificate for access to the web server.

It is also possible that other variations of this method may be used to guarantee that the single sign-on certificate is placed first in the list. Another way to do this is to always add identified single sign-on certificates to the front of the list and all other certificates to the end of the list.

Another method for doing this is to do a dynamic search upon the request for a certificate so that a Microsoft system always sees this certificate as the first on the list while other systems see the entire list upon request.

Numerous additional modifications and variations of the present invention are possible in light of the above teachings. It is therefore to be understood that within the scope of the appended claims, the invention may be practiced otherwise and as specifically described herein.

What is claimed is:

1. A method of arranging a plurality of digital certificates on a hardware token comprising:

examining an extension of each certificate identification;

recognizing whether each extension matches a specific extension; and arranging said plurality of certificates so that a certificate having an extension which matches the selected extension is placed in a specific location in a list of said plurality of certificates.

2. The method according to claim 1, wherein the specific location is first in said list.

3. The method according to claim 1, wherein the selected extension indicates a single sign-on certificate.

4. The method according to claim 1, wherein the hardware token is a smart card.

5. A system for arranging digital certificates on a hardware token, comprising:

a data storage area on said hardware token;

a reader for examining an extension on a digital certificate;

a comparator for comparing said read extension with a selected extension; and an arranger for placing a certificate in a specific location on said token in accordance with the output of said comparator.

6. A system according to claim 5, wherein the digital certificate having an extension which matches the selected extension is placed first in the list of certificates.

7. The system according to claim 5, wherein the selected extension indicates a single sign-on certificate.

8. An article comprising a storage medium having instructions stored therein, the instructions when executed causing a processing device to perform:

examining an extension on a digital certificate;

comparing said examined extension with a selected extension; and arranging the certificate in a specific location on said article in accordance with the results of said comparing.

9. The article according to claim 8, wherein the digital certificate having an extension which matches the selected extension is placed first in a list of certificates.

10. The article according to claim 8, wherein the selected extension indicates a single sign-on certificate.

* * * * *